May 30, 1933. B. P. HOFFMAN 1,911,280
VALVE
Filed May 12, 1930 2 Sheets-Sheet 1

INVENTOR
Benjamin P. Hoffman
BY
Arthur C. Brown.
ATTORNEY

May 30, 1933.  B. P. HOFFMAN  1,911,280
VALVE
Filed May 12, 1930   2 Sheets-Sheet 2
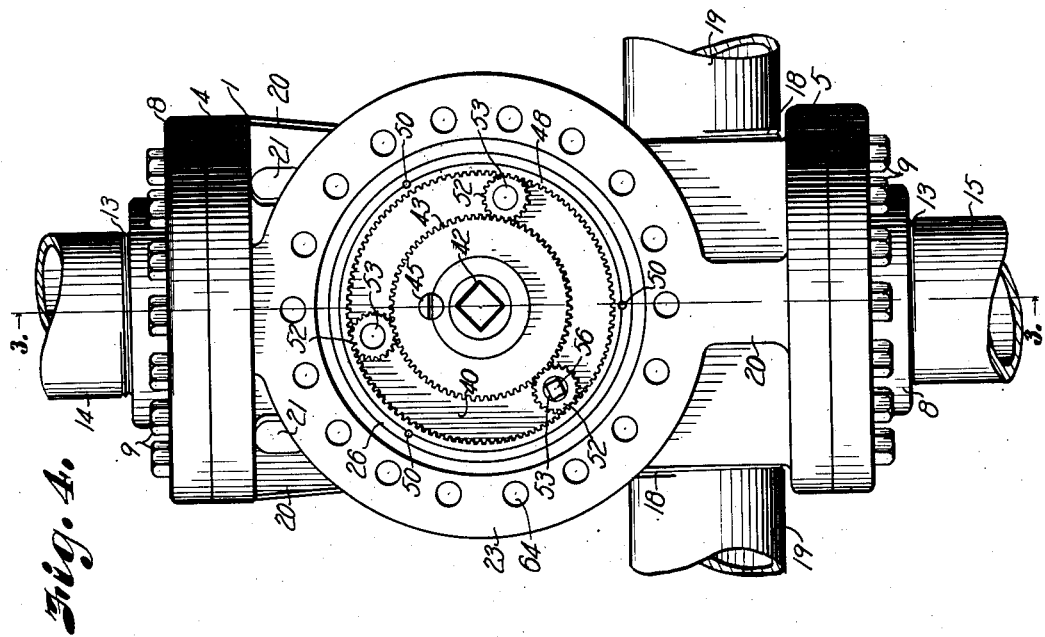
INVENTOR
Benjamin P. Hoffman
BY
Arthur C. Brown,
ATTORNEY Patented May 30, 1933

1,911,280

UNITED STATES PATENT OFFICE

BENJAMIN P. HOFFMAN, OF TULSA, OKLAHOMA, ASSIGNOR OF ONE-HALF TO CHARLES S. JONES, OF TULSA, OKLAHOMA

VALVE

Application filed May 12, 1930. Serial No. 451,752.

My invention relates to valves and more particularly to heavy duty gate valves of the character employed in controlling flow of large volumes of fluid under high pressures.

The principal objects of my invention are to provide a valve that can be easily operated under very high fluid pressures and that embodies additional sealing insurance to that of valves commonly supplied, for eliminating the loss and hazards incident to leakage.

A further object of this invention is to provide a valve having its through port on an axial line with the flow channel irrespective of its degree of opening.

In accomplishing these and other objects of my invention I have provided improved details of structure the preferred form of which is illustrated in the accompanying drawings wherein:

Fig. 3 is a central section on the line 3—3 Fig. 4 also showing the valve in closed position.

Fig. 4 is an elevational view of the valve with an end-plate removed to disclose the operating gears.

Figure 2:
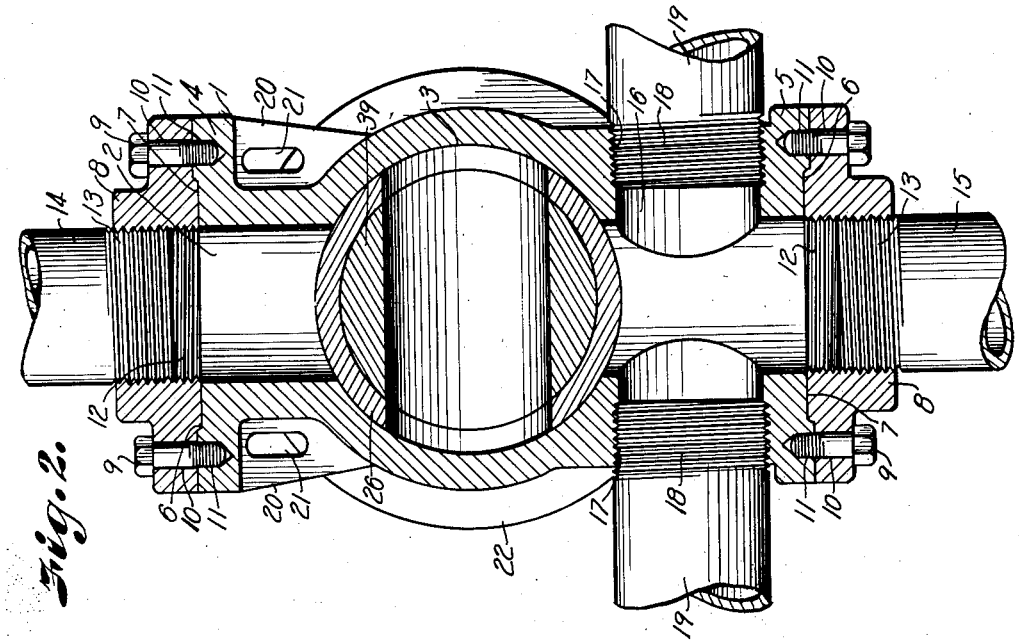
Fig. 2 is a central transverse section of the valve on the line 2—2 Fig. 3, showing the valve in closed position.
Figure 1:
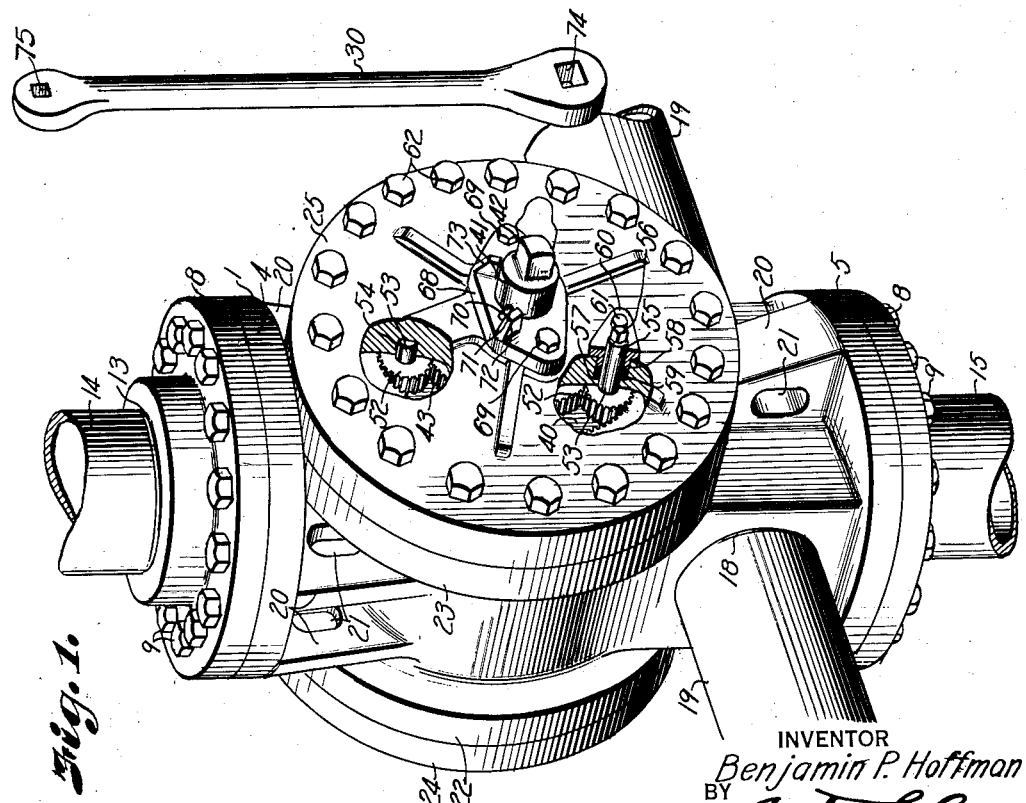
Fig. 1 is a detail perspective view of a valve embodying my invention, a portion being broken away to illustrate the valve operating mechanism and an operating lever being shown in disassembled relation with the valve.

Referring more in detail to the drawings:

1 designates a valve body having a flow channel 2 intersected by a cylindrical chamber 3 and provided at its ends with respective flanges 4 and 5, each having a counter-bored annular recess 6 for seating an annular boss 7 on a coupling flange 8, duplicate coupling flanges being secured to each end of the valve body by bolts 9 extended through openings 10 in the coupling flanges and threaded in openings 11 in the valve body.

Internally threaded openings 12 in the coupling flanges are provided for receiving the threaded ends 13 of upper and lower pipe sections 14 and 15 respectively.

Extended transversely through the valve body and through the flow channel below the cylindrical chamber is a channel 16 having internally threaded portions 17 for receiving the threaded ends 18 of pipe sections 19.

Webs 20 extending from the valve body to the end flanges are further provided for strengthening the valve, and openings 21 therein may be employed for anchoring the valve where necessary, as for example when used as a control head on well tubing.

Opposite flanges 22 and 23 are formed integrally with opposite ends of the valve body and in concentric alignment with the cylinder chamber 3 for respectively seating end plates 24 and 25 later to be more fully described.

Rotatably mounted in the chamber 3 is a cylinder 26 provided with a closed end 27 having an outwardly directed concentric journal 28, terminating in a squared end 29, to permit application of a wrench 30 for rotating the cylinder. When mounted in the chamber the journal end of the cylinder is extended through an opening 31 in the end plate 24 which is secured to the valve housing by bolts 32 extended through openings 33 in the end plate and threaded into openings 34 in the valve housing. A counterbored portion 35 in the opening 31 is adapted to receive packing 36, retained therein by a gland 37 to seal the rotary movement of the journal in the bearing opening.

Annular grooves 38 are formed on the outer surface of the cylinder adjacent its ends, to contain lubricant for effectively sealing the cylinder in the chamber.

An inner concentric valve 39, rotatably mounted in the cylinder, is provided with a closed end 40, having an outwardly extending, concentric journal portion 41 terminating in a squared end 42.

In order to rotate the inner valve and cylinder simultaneously and in opposite directions to each other, a gear 43 is mounted on an enlarged portion 44 of the journal 41 and is fixed to the inner valve by a screw 45 extended through on opening 46 and threaded into an opening 47 in the inner valve.

A cooperating ring gear 48 is seated in a counter-bored recess 49 in the open end of the cylinder, and is secured therein by spaced pins 50 driven into openings 51 in the cylinder.

Mounted in the annular space reserved between the gear ring and gear 43 are equally spaced gear pinions 52, having spindle bosses 53 adapted to rotate in sockets 54 in the end plate 25. The spindle on one of the pinions is extended to form a shaft 55 having a squared end portion 56, projecting through an opening 57 in the end plate, said opening being counter-bored as at 58 to receive packing material 59 compressed therein by a gland 60 attached to the end plate by bolts 61.

The end plate 25 is secured to the valve body by bolts 62 inserted in an annular series of openings 63 in the plate and threaded into registering openings 64 in the valve body, the plate 25 having a concentric bearing opening 65 for receiving the journal 41 of the inner valve 39, and a counter-bored portion 66 in said opening for seating packing 67, compressed therein by a gland 68 attached to the end plate by bolts 69.

In order to determine when the valve has been fully opened or closed, a pin 70 is fixed in an opening 71 in the journal 41 to limit rotational movement of the journal in either clockwise or anti-clockwise direction by contacting respectively with stop lugs 72 or 73, formed on the outer face of the packing gland 68.

The wrench or lever 30 may be provided at one end with a squared socket 74 to engage the squared portion of either of the large journals, and with a smaller socket 75 on its opposite end for engaging the squared end 56 of the shaft 55.

A valve constructed and assembled as described, may be interposed in a flow line or used as a control head on well tubing.

The inner valve and cylinder may be rotated by applying the wrench to either of the journals 28 or 41, or to the shaft 55. It will be apparent that by rotating the shaft 55, a minimum amount of effort is required for operating the valve, due to the reduction in the gearing, whereas a maximum amount of power is required for operating the valve when rotating the journal 28.

Since the inner valve and cylinder are geared to rotate simultaneously through the same number of degrees and in opposite directions to each other the channel through the valve, when the valve is in either partly or fully opened position, will always be on an axial line with the flow line.

What I claim and desire to secure by Letters Patent is:

1. In a valve of the character described, a housing having a flow channel and a transverse cylindrical chamber intersecting the flow channel, a cylinder in the chamber having ports registering with the flow channel, a ring gear on the cylinder, an inner valve in said cylinder having a bore registering with the flow channel, a gear on the inner valve, gear pinions meshing with said gear and ring gear, an operating shaft fixed to one of the gear pinions and extending through the housing, and means for rotating the operating shaft to simultaneously rotate said inner valve and cylinder.

2. In a valve of the character described, a housing having a flow channel and a transverse cylindrical chamber intersecting the flow channel, a cylinder in the chamber having ports registering with the flow channel and having a closed end, a journal on the closed end of the cylinder, a plate on the housing having a bearing opening for receiving said journal, a gear ring on the cylinder opposite its closed end, an inner valve in the cylinder having a bore registering with the flow channel, a journal on the inner valve, a plate on the housing opposite the first-named plate, and having an opening for receiving said last-named journal, a gear concentrically mounted on the inner valve, a gear pinion rotatable in said last-named plate and meshing with the gear and gear ring, and means for operating the gears to simultaneously rotate the inner valve and cylinder in opposite directions.

3. In a valve of the character described, a housing having a flow channel and a transverse cylindrical chamber intersecting the channel, end plates on the housing for closing said chamber having bearing openings, a cylinder in the chamber having ports registering with the flow channel and having a closed end, a journal on said closed end and extended through one of the bearing openings, an inner valve in the cylinder having a bore registering with the flow channel, a journal on the inner valve and extended through the other bearing opening, gear means operably connecting said cylinder and inner valve, and means for rotating either of said journals to simultaneously rotate the cylinder and inner valve for controlling flow of fluid through said flow channel.

4. In a valve of the character described, a housing having a vertical flow channel and a transverse cylindrical chamber intersecting the channel, a horizontal flow channel in said housing in transverse relation to said chamber, a cylinder in the chamber having ports registering with the vertical channel, an inner valve in said cylinder having a bore registering with the vertical channel, and means for rotating the inner valve and cylinder to control flow of fluid from the horizontal channel and from one end of the vertical channel to the other end of said vertical channel.

In testimony whereof I affix my signature.

BENJAMIN P. HOFFMAN.